Figure 1:
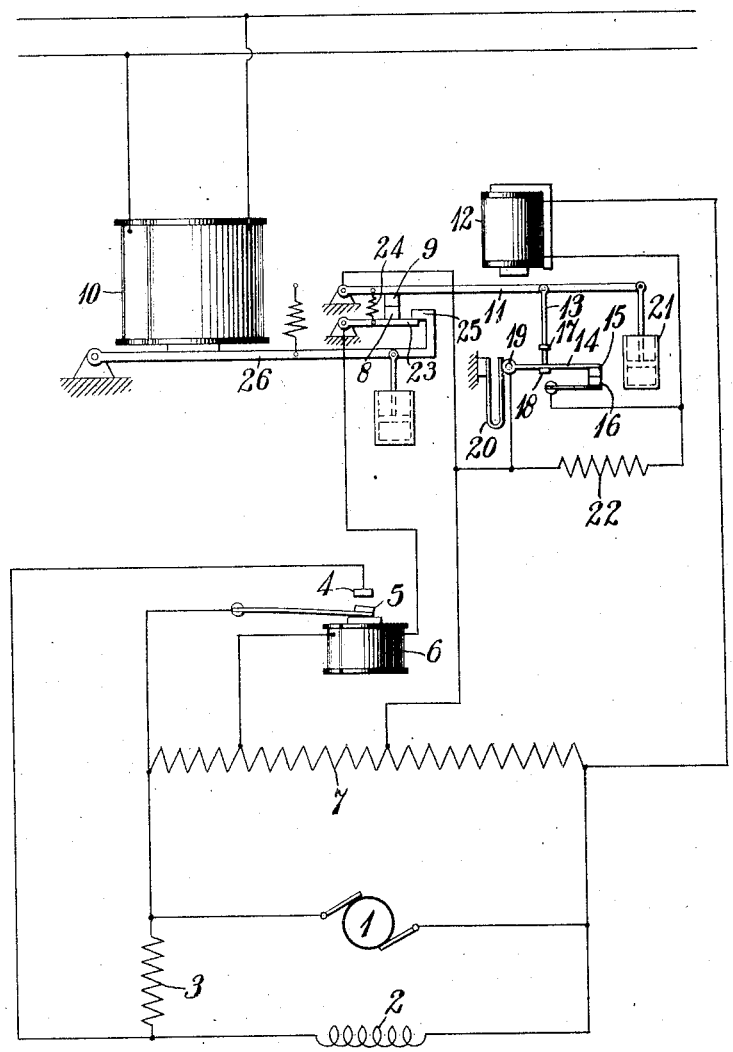

A. H. OLMSTED.
VOLTAGE REGULATOR.
APPLICATION FILED NOV. 18, 1914.

1,166,150.

Patented Dec. 28, 1915

WITNESSES:
Fred H Miller
J H Procter

INVENTOR
Alexander H. Olmsted
BY
Wiley G Carr
ATTORNEY

UNITED STATES PATENT OFFICE.

ALEXANDER HOLLEY OLMSTED, OF ALTRINCHAM, ENGLAND.

VOLTAGE-REGULATOR.

1,166,150.  Specification of Letters Patent.  Patented Dec. 28, 1915.

Application filed November 18, 1914. Serial No. 872,753.

*To all whom it may concern:*

Be it known that I, ALEXANDER HOLLEY OLMSTED, a citizen of the United States, and a resident of Altrincham, in the county of Chester, England, have invented a new and useful Improvement in Voltage-Regulators, of which the following is a specification.

My invention relates to voltage regulators of the kind adapted to vary the excitation of an electric generator or of its exciter so as to maintain a constant voltage on the generator terminals.

The object of my invention is to provide a simple means for adapting such regulators for a wide range of conditions.

In the regulator described in United States application, Serial No. 744,646, filed Jan. 28, 1913, a resister that is connected in series with the field magnet winding of the generator or its exciter is arranged to be short-circuited through two contacts operated by a relay magnet and the energization of the magnet is controlled by a pair of contacts one of which is carried on a vibrating arm and the other of which is mounted on a lever the position of which is adjusted in accordance with the voltage to be regulated. The vibrating arm is caused to oscillate by means of an electro-magnet hereinafter termed the vibrator magnet the circuit through which is made and broken through two contacts one of which is spring supported and the other of which is mounted on the vibrating arm in the manner of an electric trembling bell, the rate of vibration being substantially constant.

According to my present invention, in place of locating the last mentioned movable contact member, that controls the circuit of the vibrator magnet directly on the vibrating arm, the said contact is mounted on a pivotally mounted lever connected by a link with the vibrating arm. A certain amount of lost motion is provided between the vibrating arm and the pivoted lever. The vibrating arm has its movement damped or retarded by means of a dash pot and the pivoted lever is provided with means that causes it to stop in any position to which it is moved unless it is positively moved from such position. Such means, for example, may consist of a spring arranged to press upon the pivot of said lever. The coil of the electro-magnet which operates the vibrating arm in place of being energized from a battery, as in the specification of the patent referred to, is connected across a resistance in the exciter or generator circuit, or any suitable source of current. The relay connections and the other parts of the regulator are substantially similar to those described in the specification referred to.

In order that the invention may be clearly understood it will now be described with reference to the accompanying drawings in which—

Figure 2:
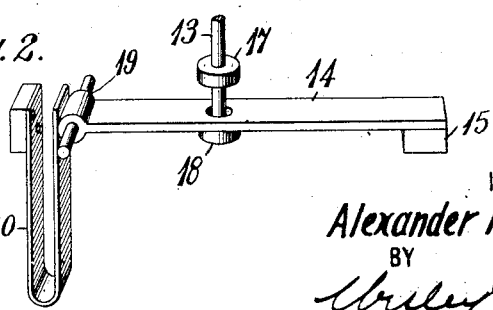

Figure 1 is a diagrammatic view of a regulator embodying my invention, and Fig. 2 is a perspective view of the device embodying my invention.

In Fig. 1, 1 is the exciter, 2 the field winding thereof, and 3 the resistance that is cut into and out of the field circuit by means of relay contacts 4, 5 governed by a relay magnet 6. The relay magnet 6 is energized from a resistance 7 that is connected in circuit with the exciter in the usual way and the circuit of the relay magnet 6 is opened and closed through two contacts 8 and 9. The contact 8 is adjusted in position by means of an electro-magnet 10 that is energized from the circuit the potential of which is to be regulated, while the contact 9 is carried by an arm 11 that is caused to vibrate by means of an electro-magnet 12. The vibrating arm 11 is connected through a link 13 to a lever 14 carrying a contact 15 that coöperates with a resiliently supported contact 16 for governing the circuit of the electro-magnet 12. The link 13 has a lost motion connection with the lever 14 by means of two stops 17 and 18 spaced a short distance apart and the lever 14 is further arranged so as to move stiffly on its pivot. One means for insuring this stiffness of movement is illustrated in Fig. 2 in which 19 is a cylindrical shaft on which the lever 14 is mounted, said shaft being suitably supported at each end and 20 is a flat spring adapted to press against the said shaft so that the friction will hold the shaft and lever 14 in any position to which the latter is moved. By this arrangement the lever 14 will only be moved by reason of a positive engagement of the stops 17 and 18 therewith. The arm 11 is also provided with a dash pot 21 that serves to damp its vibration. 22 is a resistance connected across the contacts 15 and 16 in order to reduce the sparking.

The vibrator electromagnet 12 with its armature will operate to cause the arm 11 to vibrate with a relatively slow frequency and thus cause the contact 9 to vibrate, the weight of the lever 23 to which the contact member 8 is connected and the force of a spring 24 between the same and the arm 11 being so small compared with the mass of the lever 11 that the fact of the contacts 8 and 9 being in or out of engagement will not affect the vibration of the arm 11. The circuit of the relay 6 is made and broken by the contacts 8 and 9, and the length of time per vibration of the arm 11 that these contacts remain in engagement will be determined by the position of a stop 25 carried by the armature 26 of the magnet coil 10. The position of the armature or lever 26 and the stop 25 will vary in accordance with variations in the voltage applied to the terminals of the magnet coil 10, and, consequently, the periods of time during which the relay 6 is energized and the corresponding periods of time during which the resister 3 is not short-circuited will vary in a similar manner.

It will be observed that in the upper extreme position of the stop 25 which it takes when the voltage applied to the magnet coil 10 exceeds a certain predetermined value, the contact members 8 and 9 remain permanently in engagement, whereas in the extreme lower position of the stop 25 that occurs when the voltage applied to the magnet coil 10 below another predetermined limit the contact member 8 will not be engaged by the contact member 9. In the first case, the register 3 will always be connected in series relation to the field winding 2, whereas in the second case, the resister 3 will be permanently short circuited.

It has been found that with the arrangements described the vibration of the arm 11 is relatively slow, consequently there is little likelihood of the contacts 8 and 9 being damaged when the regulator is used on heavy loads. Furthermore, owing to the damping effect of the dash pot 21 and the lost motion introduced between the arm 11 and the lever 14 which carries the contact 15, the device will operate satisfactorily even when the voltage supplied to the coil 12 varies considerably over a wide range, and this enables a portion of the exciter circuit, as shown in the drawings, to be used as a source of supply for the coil 12. The coil 12 and the relay coil 6 may, however, be supplied from the generator circuit or from any other source if desired.

While I have shown my invention in a preferred form, it is not so limited, but it may be modified within the scope of the appended claims.

I claim as my invention:

1. An electrical regulator comprising co-operating main contact members, an arm carrying one of the said members, an electromagnet for relatively slowly vibrating the said arm, a pair of auxiliary contact members for controlling the circuit of the said electromagnet, a lost motion connection between one of the said auxiliary contact members and the said vibrating arm, a second arm upon which the other main contact member is mounted, means normally tending to cause the main contact members to engage, a third arm for varying the position of the second arm, and means for governing the position of the third arm in accordance with variations of the quantity regulated.

2. An electrical regulator comprising co-operating main contact members, means for vibrating one of the said members at a substantially constant frequency, means for supporting the other main contact member, an arm controlling the position of the said supporting means, means for controlling the position of the said arm in accordance with variations of the quantity regulated, and a lost motion means controlled by the said vibrating main contact member for controlling the said means for vibrating the said main contact member.

3. An electrical regulator comprising co-operating main contact members, means for relatively slowly vibrating one of the said main contact members, means for supporting the other main contact member, means for controlling the position of the supporting means for the other main contact member in accordance with variations of the quantity regulated, auxiliary contact members for controlling the said means for vibrating one of the main contact members, and a lost motion connection between the vibrating main contact member and one of the auxiliary contact members.

4. An electrical regulator comprising co-operating main contact members, means for relatively slowly vibrating one of the said main contact members, means for supporting the other main contact member, means for controlling the position of the supporting means for the other main contact member in accordance with variations of the quantity regulated, stationary and movable auxiliary contact members for controlling the said means for vibrating one of the main contact members, means for restraining the said movable auxiliary contact member, and a lost motion connection between the vibrating main contact member and the said movable auxiliary contact member.

5. In an electrical regulator, the combination with two main contact members and means for vibrating one of the same, of two auxiliary contact members for controlling the means for vibrating one of the main contact members, means for restraining the movable auxiliary contact member in any position, and a lost motion connection between the vibrating main contact member and the movable auxilary contact member.

6. In an electrical regulator, the combination with two main contact members and means for vibrating one of the same, of two auxiliary contact members for controlling the means for vibrating one of the main contact members, resilient means for restraining the movable auxiliary contact member in any position, and a lost motion connection between the vibrating main contact member and the movable auxiliary contact member.

7. A contact device comprising a vibrating member, means for vibrating the same, contact members for controlling the said means for vibrating the vibrating member, means for restraining the movable contact member in any position, and a lost motion connection between the vibrating member and the movable contact member.

In testimony whereof I have hereunto subscribed my name this third day of November 1914.

ALEXANDER HOLLEY OLMSTED.

Witnesses:
 N. W. BOWMAN,
 JAS. STEWART BROADFOOT.